US009353002B2

(12) United States Patent
Grelaud

(10) Patent No.: US 9,353,002 B2
(45) Date of Patent: May 31, 2016

(54) CURABLE HYDRAULIC BINDER-BASED CEMENT MATERIAL INTENDED TO BE USED AT LOW TEMPERATURES

(71) Applicant: CIMENTS FRANCAIS, Puteaux (FR)

(72) Inventor: Jean-Pierre Grelaud, Saint Martin la Garenne (FR)

(73) Assignee: CIMENTS FRANCAIS, Puteaux (FR)

( * ) Notice: Subject to any disclaimer, the term of this patent is extended or adjusted under 35 U.S.C. 154(b) by 0 days.

(21) Appl. No.: 14/653,107

(22) PCT Filed: Dec. 16, 2013

(86) PCT No.: PCT/FR2013/053085
§ 371 (c)(1),
(2) Date: Jun. 17, 2015

(87) PCT Pub. No.: WO2014/096649
PCT Pub. Date: Jun. 26, 2014

(65) Prior Publication Data
US 2015/0329422 A1 Nov. 19, 2015

(30) Foreign Application Priority Data

Dec. 18, 2012 (FR) ...................................... 12 62226

(51) Int. Cl.
*C04B 28/04* (2006.01)
*C04B 28/06* (2006.01)
*C04B 7/32* (2006.01)
*C04B 7/02* (2006.01)
*C04B 28/16* (2006.01)
C04B 111/70 (2006.01)
C04B 111/76 (2006.01)

(52) U.S. Cl.
CPC ...... *C04B 7/32* (2013.01); *C04B 7/02* (2013.01); *C04B 28/04* (2013.01); *C04B 28/06* (2013.01); *C04B 28/065* (2013.01); *C04B 28/16* (2013.01); *C04B 2111/70* (2013.01); *C04B 2111/76* (2013.01); *Y02P 40/148* (2015.11)

(58) Field of Classification Search
CPC ........ C04B 7/02; C04B 7/323; C04B 7/3453; C04B 22/143; C04B 22/148; C04B 22/149; C04B 24/26; C04B 24/38; C04B 24/383; C04B 28/04; C04B 28/06; C04B 28/065; C04B 28/16
See application file for complete search history.

(56) References Cited

U.S. PATENT DOCUMENTS

| | | | | |
|---|---|---|---|---|
| 7,445,668 B2 * | 11/2008 | Sommain | ................ | C04B 7/345 106/693 |
| 7,850,776 B2 * | 12/2010 | Gartner | ................... | C04B 7/323 106/692 |
| 8,568,528 B2 * | 10/2013 | Barnes-Davin | ......... | C04B 7/323 106/739 |
| 8,574,359 B2 * | 11/2013 | Marchi | ................... | C04B 7/323 106/692 |
| 9,073,784 B2 * | 7/2015 | Bullerjahn | ............ | C04B 7/3453 |
| 2004/0241271 A1 | 12/2004 | Derusco et al. | | |
| 2005/0014034 A1 | 1/2005 | Bouscal et al. | | |
| 2012/0037046 A1 | 2/2012 | Le Rolland et al. | | |
| 2014/0144349 A1 * | 5/2014 | Raz | ........................ | C04B 28/08 106/707 |

FOREIGN PATENT DOCUMENTS

| | | |
|---|---|---|
| DE | 42 13 401 A1 | 10/1993 |
| DE | 195 01 100 A1 | 7/1996 |
| EP | 0 211 194 A1 | 2/1987 |
| EP | 0 353 062 A2 | 1/1990 |
| EP | 0 439 372 A2 | 7/1991 |
| EP | 0 657 398 A1 | 6/1995 |
| EP | 1428804 A2 * | 6/2004 |
| FR | 2 671 342 A1 | 7/1992 |
| JP | 2008 162837 A | 7/2008 |
| WO | 02/098622 A1 | 12/2002 |
| WO | 02/098815 A1 | 12/2002 |
| WO | 2010/109116 A2 | 9/2010 |

OTHER PUBLICATIONS

International Search Report, dated May 8, 2014, from corresponding PCT application.

* cited by examiner

*Primary Examiner* — Anthony J Green
(74) *Attorney, Agent, or Firm* — Sofer & Haroun, LLP

(57) ABSTRACT

Cement material, curable in the presence of water and including a hydraulic binder composition, which contains a mixture of hydraulic binders and a mixture of sulphate sources, wherein the hydraulic binder mixture includes: at least one hydraulic binder containing an alite-type mineralogical phase and at least one hydraulic binder containing an aluminate-type mineralogical phase, mainly consisting of ye'elimite (C4A3$) or a mixture of ye'elimite and calcium monoaluminate (CA), the mixture of sulphate sources containing at least one sulphate source with a solubility of <4 g·L−1, and at least one sulphate source with a solubility >4 g·L−1, the cement material optionally including mineral additions, fine granulates, large granulates and additives. The curable cement material is useful as a material capable of setting in cold weather, in particular a concrete, a mortar, a grout, a coating or a cement paste to be used at a temperature of −10° C. to +5° C.

15 Claims, No Drawings

CURABLE HYDRAULIC BINDER-BASED CEMENT MATERIAL INTENDED TO BE USED AT LOW TEMPERATURES

The present invention relates to curable cement materials that can set at low temperatures, while offering satisfactory short-term and long-term mechanical performance qualities. The present invention also relates to the use of these curable cement materials in a use at low temperatures.

The use of a hydraulic binder in curable cement materials such as renderings, grouts, cement pastes, mortars or concretes under winter conditions, at high altitude, or in countries that are usually very cold is problematic. Low temperatures (−10° C. to +5° C.) considerably lengthen the setting times and impair the short-term strength, this strength after 1 day typically being low (of the order of 1 to a few MPa). On the other hand, the long-term strength (28 days) is not affected by the cold, and remains similar to that of renderings, grouts, cement pastes, mortars or concretes cast at usual temperatures (+20° C.)

This constraint regarding the short-term strength of concretes and mortars is a handicap for the construction industry. Building sites are obliged to come to a halt when the exterior temperatures fall below a certain threshold. The cast concretes and mortars do not develop sufficient strength to be exploitable, and deshuttering is hazardous or even impossible. The structures obtained cannot withstand the stresses exerted by the mass of the following castings, and the usual daily rotations for deshuttering cannot be envisaged. In summary, construction sites come to a halt when the exterior temperature falls within the region of 0° C.

It is thus desirable to have available curable cement materials that can develop satisfactory short-term strength in cold weather (typically −10° C. to +5° C.), while maintaining long-term mechanical strength comparable to that of curable cement materials based on Portland cement cast at more standard temperatures (+20° C.)

A person skilled in the art knows the combination of Portland cement and of cement of sulfoaluminous type (for example: EP0353062, EP0439372, WO2002098622, WO2002098815). These combinations are reputed to develop high mechanical strength rapidly.

Cements of sulfoaluminous types are difficult to use on account of the possibility of formation of undesirable mineral species after setting of the cement matrix, especially the "delayed" formation of ettringite. These expansive crystals may bring about rupture of the cement matrix, and the long-term mechanical strength of the works may be compromised. Furthermore, cements of sulfoaluminous type often have very short setting times, of the order of a few minutes, which does not make the product easy to use.

A person skilled in the art is thus confronted with a twofold constraint: proposing a curable cement material that offers good short-term mechanical properties when it is used at low temperature, without, however, excessively impairing the setting times, the workability time and the long-term strength.

One aim of the present invention is to propose a curable cement material for obtaining short-term and long-term strength comparable to that of curable materials based on Portland cements applied or cast at about +20° C.

Another aim of the present invention is to propose a curable cement material which can be used at low temperatures and which makes it possible to obtain short-term and long-term strength that are satisfactory to those skilled in the art.

The present invention allows these constraints to be satisfied by means of a cement material that is curable in the presence of water, comprising a composition of hydraulic binders containing a mixture of hydraulic binders and a mixture of sources of sulfates, characterized in that said mixture of hydraulic binders comprises at least one hydraulic binder containing a mineralogical phase of alite type, and at least one hydraulic binder containing a mineralogical phase of aluminate type, consisting predominantly of ye'elimite $C_4A_3\$$ or a mixture of ye'elimite and of calcium monoaluminate CA said mixture of sources of sulfates comprising said mixture of sources of sulfates comprising at least one source of sulfates having a solubility of less than $4 \text{ g}\cdot\text{L}^{-1}$, and at least one source of sulfates having a solubility of greater than $4 \text{ g}\cdot\text{L}^{-1}$, said cement material comprising, in addition to said composition of hydraulic binders, optionally mineral additions, optionally fine granulates, optionally coarse granulates, and optionally adjuvants.

In the present invention, unless otherwise mentioned, all the solubilities are considered at a temperature of 0° C., in pure water, and are expressed in $\text{g}\cdot\text{L}^{-1}$.

The presence of at least one source of sulfates with a solubility of greater than $4 \text{ g}\cdot\text{L}^{-1}$ is necessary to be able rapidly to form ettringite; this material participates in the development of the short-term strength of the material. Ettringite is formed from aluminate phases originating both from the hydraulic binder containing a mineralogical phase of aluminate type, and from the hydraulic binder containing a mineralogical phase of alite type.

The presence of at least one source of sulfates with a solubility of greater than $4 \text{ g}\cdot\text{L}^{-1}$ makes it possible to ensure that the puddling water is initially very highly concentrated in sulfates so that there are sufficient sulfate ions to form all the ettringite possible as a function of the phases present. It is desirable to avoid the formation of monosulfate hydrate (AFm or $3C_4A\$H_{12}$ in cement notation). The reason for this is that a deficiency in sulfates leads to the formation of monosulfate hydrate directly or by decomposition of ettringite. This monosulfate hydrate, which is highly unstable, does not afford the cement matrix any strength. Furthermore, exposure to a source of sulfates dissolved in water after the curing step would give rise to a "delayed" reaction for the formation of ettringite from monosulfate hydrate. The delayed formation of ettringite is accompanied by swelling and may cause expansions, flaking, or even hazardous structure explosion.

The presence of at least one source of sulfates with a solubility of less than $4 \text{ g}\cdot\text{L}^{-1}$ makes it possible to ensure prolonged release of sulfates in the cement matrix throughout the maturation. It especially ensures that the hydration reactions that take place over the long term do not modify the species rapidly formed at the start of setting of the curable cement material (for example a conversion of ettringite into monosulfate hydrate).

Thus, surprisingly, the two types of sources of sulfates each have a crucial role and participate in different steps of the formation of the hydrates in the curable cement material.

It has also been observed that a curable cement material used according to the present invention shows less pronounced shrinkage than the same material used with a binder of Portland type alone. This advantage appears to be associated with the presence of the expansive ettringite crystals, which are thought to partly compensate for the shrinkage. Such a use of ettringite is known to those skilled in the art.

The term "curable cement material" denotes any type of mixture that can develop mechanical strength, especially grouts, cement pastes, renderings, mortars and concrete.

The term "grout" or "cement paste" denotes the addition of water to the hydraulic binder composition according to the present invention. The distinction between these two names is linked to the mass ratio between water and the mixture of hydraulic binders: if the ratio is less than 0.35, the mixture is known as cement paste, and if the ratio is greater than 0.35, the mixture is known as grout. Usually, cement pastes are supplemented with superplasticizers and optionally rheology modifiers, and grouts are optionally supplemented with superplasticizers and/or rheology modifiers.

The term "superplasticizer" denotes a deflocculant organic compound, which acts by electrostatic repulsion and/or by steric bulk. Examples of superplasticizers that may be mentioned include polycarboxylates, melamine sulfonates and polynaphthalene sulfonates.

The term "rheology modifier" denotes an organic compound for increasing the viscosity, the cohesion and the shear threshold of the cement matrix. The rheology modifiers according to the present invention have an anti-bleeding effect. Examples of rheology modifiers that may be mentioned include modified or unmodified polysaccharides (diutan gums, xanthan gums, gellan gums, welan gums) and water retainers (starch ethers, cellulose ethers).

The term "rendering" denotes a grout or cement paste to which are added very fine granulates, i.e. granulates with a diameter of between 150 μm and 1 mm (for example fillers).

The term "mortar" denotes a grout or a cement paste to which are added fine granulates, i.e. granulates whose diameter is between 150 μm and 5 mm (for example sand), and optionally very fine granulates.

The term "concrete" denotes a mortar to which are added coarse granulates, i.e. granulates with a diameter of greater than 5 mm.

The renderings, mortars and concretes are usually supplemented with superplasticizers, and optionally rheology modifiers.

The cement pastes, renderings, grouts, mortars and concretes, and the dry compositions (i.e. the renderings, mortars and concrete before the addition of water) known as "pre-mixes", described above, form part of the subject of the present invention.

The term "binder" means a hydraulic binder within the meaning of standard EN 197.1, and especially the definition in paragraph 4: finely ground mineral material which, when puddled with water, forms a paste which sets and cures via the sequence of hydration reactions and processes and which, after curing, conserves its strength and its stability, even under water.

The curable cement material according to the present invention may also contain, in addition to the hydraulic binder composition, additions, adjuvants, added materials, or a combination thereof.

The term "filler" denotes a finely ground mineral material, 85% of the elements of which have a diameter of less than 80 μm. Fillers are especially used for optimizing the compactness by filling the voids.

The term "addition" denotes a finely ground mineral material which may or may not have a pozzolanic effect. The term "pozzolanic effect" denotes herein a contribution to the development of mechanical strength. Additions are generally finely ground and have a diameter of less than 400 μm, especially less than 150 μm. Additions may be ground separately from the hydraulic binders, or co-ground therewith.

Among the fillers and additions having a pozzolanic effect, mention may be made of: blast furnace slags, flyash, silica fumes.

Among the fillers and additions not having a pozzolanic effect, mention may be made of: limestone fillers, siliceous fillers.

According to one variant, the curable cement material comprises, in addition to said hydraulic binder composition, a finely ground mineral addition chosen from: limestone, slag, flyash, silica fumes, or a combination of several of these minerals.

These mineral additions are defined in standard EN 197-1, paragraph 5.2. For the purposes of the present invention, Portland clinker is a hydraulic binder containing a mineralogical phase of alite type, and is therefore not considered as a mineral addition.

Commonly, calcium sulfates, especially gypsum or anhydrite, are occasionally added to Portland clinker (during grinding) to constitute a hydraulic binder. These additions of gypsum to a proportion of 3% to 8% (as mass percentage, addition of pure gypsum) are performed in order to regulate the setting and especially to avoid "flash" setting of the Portland cement.

It has been observed that these additions do not make it possible to provide all of the supplies of source of sulfates with a solubility of less than $4 \text{ g·L}^{-1}$, according to the present invention (see the experimental section).

The term "adjuvant" denotes a substance within the meaning of standard EN 206.1, and especially the definition in paragraph 3.1.22: a product added to the concrete during the mixing process, in small amounts relative to the mass of cement, to modify the properties of the fresh or cured concrete.

The term "added material" denotes substances or materials that may be added to curable materials, but which are not additions, fillers or adjuvants as described in the present text. Examples of added materials that may be mentioned include: fibers serving to reinforce the structure (metal, organic or mineral fibers), oxides giving photocatalytic properties ($TiO_2$), heavy particles for insulating against ionizing radiation (ore particles, especially of iron ore), electrically conductive particles for shielding constructions against electromagnetic radiation by affording Faraday cages (such as graphite), heat-conducting particles (metals), phase-change particles (PCM: "phase-change materials") for storing heat energy in a structure, or light particles that provide heat and sound insulation (organic particles such as polystyrene or minerals such as vermiculite, perlite, silicoaluminates or melt-blown glasses).

The mineralogical phases are indicated by their usual name followed by their cement notation. The primary compounds are represented in the cement notation by the oxide varieties: C for CaO, S for $SiO_2$, A for $Al_2O_3$, $ for $SO_3$, H for $H_2O$; this notation is used throughout the present text.

The term "mineralogical phase of alite type" denotes the mineral alite of chemical formula $3CaO.SiO_2$, or "C3S" in cement notation, and all the polymorphs thereof such as the monoclinic structures (M2, and particularly M1 and M3), triclinic structures (T1, T2 and T3) and rhombohedric structures (R).

Preferentially, said at least one hydraulic binder containing a mineralogical phase of alite type is a Portland-type clinker or a Portland-type cement.

The term "Portland-type" denotes any cement compound containing Portland clinker, especially CEM 1, II, III, IV and V within the meaning of standard EN 197-1, paragraph 5.2.

The present invention may be performed with a combination of several hydraulic binders each containing a mineralogical phase of alite type. However, for reasons of simplicity of use, it is preferred to perform the present invention with only one hydraulic binder containing a mineralogical phase of alite type.

Preferably, said at least one hydraulic binder containing a mineralogical phase of alite type consists predominantly of alite.

The term "consists predominantly" means consisting of more than 50%, especially more than 60% and preferentially more than 63% by mass.

The term "mineralogical phase of aluminate type" denotes any mineralogical phase resulting from the combination of aluminate (of chemical formula $Al_2O_3$, or "A" in cement notation), with other mineral species.

More precisely, said mineralogical phase of aluminate type also comprises mayenite (C12A7), tetracalcium aluminoferrite (C4AF), tricalcium aluminate (C3A), or a combination of several of these phases.

Said at least one hydraulic binder containing a mineralogical phase of aluminate type is chosen from a sulfoaluminous clinker, a sulfobelitic clinker or a mixture of these clinkers.

The present invention may be performed with a combination of several hydraulic binders each containing a mineralogical phase of aluminate type. However, for reasons of simplicity of use, it is preferred to perform the present invention with only one hydraulic binder containing a mineralogical phase of aluminate type.

Preferably, said at least one hydraulic binder containing a mineralogical phase of aluminate type is a sulfoaluminous clinker.

The term "sulfoaluminous" denotes any material resulting from the baking at a temperature of between 900° C. and 1350° C. of mixtures containing at least one source of lime, at least one source of aluminum and at least one source of sulfate.

The sulfoaluminous clinker forming part of the binder of the present invention has a content of ye'elimite (of chemical formula $4CaO.3Al_2O_3.SO_3$ or $C_4A_3\$$ in cement notation) of greater than 30% by weight and preferably between 50% and 70% by weight.

The term "source of sulfates" denotes a substance giving rise to the dissolution of sulfate ions. The most obvious sources of sulfates are sulfate salts, plaster, sludges or other industrial waste rich in sulfates (for example phosphogypsum or titanogypsum). The sources of sulfates may be used as a mixture. These products are rarely available in industrial amounts in high purity, since their cost would be prohibitive. It is thus appropriate to consider mixtures of products that may contain impurities. In this case, a person skilled in the art will adapt the amounts of the sources of sulfates by modifying the number of moles of sulfates (expressed as $SO_3$ or $ in cement notation) desired.

In the present invention, the solubility of a source of sulfates is likened to the solubility of the sulfate ions it contains. In other words, to determine the solubility of an impure source of sulfates, the solubility of the main species of sulfate ions of which this source is composed is considered.

Preferentially, said at least one source of sulfates with a solubility of less than 4 $g \cdot L^{-1}$ is chosen from gypsum ($CaSO_4.2H_2O$) and anhydrite ($CaSO_4$).

Preferentially, said at least one source of sulfates with a solubility of greater than 4 $g \cdot L^{-1}$ is chosen from aluminum sulfate dodecahydrate to octadecahydrate ($Al_2(SO_4)_3.12$ to $18H_2O$), iron sulfate tetrahydrate to heptahydrate ($Fe(SO_4).4$ to $7H_2O$) and plaster ($CaSO_4.\frac{1}{2}H_2O$). Advantageously, the source of sulfate with a solubility >4 g/L may be added to the puddling water.

The characteristic for distinguishing the two sources of sulfates is in reality the dissolution kinetics. However, this characteristic is difficult to determine in principle since it depends on a plurality of parameters. In point of fact, it must be determined experimentally for each sulfate considered as a function of numerous conditions such as: the temperature, the salinity of the medium (nature and concentration of the ions present), the pH, etc. Other characteristics such as the fineness of grinding of the source of sulfate and its degree of crystallization also have a significant influence on the dissolution kinetics. In practice, it is easier to consider the solubility of the species in water at a given temperature. These characteristics are well known to those skilled in the art (*CRC Handbook of Chemistry and Physics* ($92^{nd}$ edition), William M. Haynes, Editions: CRC Press/Taylor and Francis).

Pertinently, the inventor has observed that the solubility at 0° C. makes it possible to estimate the dissolution kinetics of a species without the need for long experimentation. Estimation errors are possible, but this criterion has the advantage of being simple to perform and of allowing a first selection that may be completed with precise dissolution kinetics tests, if necessary.

In one particular embodiment, the curable cement material according to the invention is characterized by a hydraulic binder composition comprising:
from more than 75% to less than 95% of said mixture of hydraulic binders, and
from more than 5% to less than 25% of said mixture of sources of sulfates,
said proportions being expressed relative to the total mass of the hydraulic binder composition.

Preferentially, the curable cement material according to the invention is characterized by the presence, in said mixture of hydraulic binders, of the following mineralogical phases: ye'elimite (C4A3$), mayenite (C12A7), calcium monoaluminate (CA), ferrite (C4AF), belite (C2S), tricalcium aluminate (C3A) and alite (C3S), said mineralogical phases having, relative to the total mass of said mixture of hydraulic binders, the following proportions:
ye'elimite (C4A3$) and calcium monoaluminate (CA): 4% to 47%, preferentially 12% to 35%
mayenite (C12A7): 0 to 4%, preferentially 0 to 2%
ferrite (C4AF): 1% to 16%, preferentially 2% to 14%
belite (C2S): 5% to 29%, preferentially 6% to 26%
tricalcium aluminate (C3A): 1% to 14%, preferentially 1% to 11%
alite (C3S): 21% to 76%, preferentially 29% to 64%.

These proportions correspond to the mineralogical phases present in the mixture of hydraulic binders: they do not take into account the at least two sources of sulfates.

More specifically, the belite mineralogical phase is composed of belite in its β form (C2S(β)).

Preferentially, the curable cement material according to the invention is characterized by the following proportions of said mineralogical phases, relative to the total mass of said hydraulic binder composition:
yeelimite (C4A3$) and calcium monoaluminate (CA): 3% to 40%, preferentially 10% to 30%
mayenite (C12A7): 0 to 3%, preferentially 0 to 2%
ferrite (C4AF): 1.2% to 14%, preferentially 2% to 12%
belite (C2S): 4% to 25%, preferentially 5% to 22%
tricalcium aluminate (C3A): 1% to 12%, preferentially 1% to 9%
alite (C3S): 18% to 65%, preferentially 25% to 55%.

These proportions correspond to the mineralogical phases present in the hydraulic binder composition; they take into account the sources of sulfates.

In one particular embodiment, the curable cement material according to the invention is characterized in that said hydraulic binder composition comprises:
- a mass proportion of said hydraulic binder containing a mineralogical phase of alite type greater than a value: A−D−C, and less than a value: C, and
- a mass proportion of said hydraulic binder containing a mineralogical phase of aluminate type greater than a value: A−C and less than a value: D+B, and
- a mass proportion of said source of sulfates with a solubility of less than 4 g·L$^{-1}$ of greater than 6% and less than a value: B, and
- a mass proportion of said source of sulfates with a solubility of greater than 4 g·L$^{-1}$ of greater than 0% and less than a value: B, said mass proportions being expressed as percentages relative to the total mass of the hydraulic binder composition, and said values A, B, C and D corresponding to the following formulae:

$$A=100\times[115.3/(X_1+X_2)],$$

$$B=100-A,$$

$$C=[100\times(53.7-B)/X_1]+B,$$

$$D=100-C,$$

in which the values $X_1$ and $X_2$ correspond:
- for $X_1$ to the mass percentage of the alite mineralogical phase in said at least one hydraulic binder containing a mineralogical phase of alite type, and
- for $X_2$ to the mass percentage of the sum of the ye'elimite and calcium monoaluminate mineralogical phases in said at least one hydraulic binder containing a mineralogical phase of aluminate type, with the proviso that the sum $X_1+X_2$ is greater than 115.3.

The amounts of mineralogical phases present in a hydraulic binder are technical data provided by the manufacturer. In the event of absence of such data or of doubt regarding the exact content, these values may be determined by analysis (XRD, quantification via the Rietveld method).

It has been observed that this embodiment based on empirical calculations makes it possible to adjust the proportions of each constituent of the hydraulic binder composition as a function of the exact nature of the hydraulic binders containing, respectively, a mineralogical phase of alite type and a mineralogical phase of aluminate type, that are used. More exactly, as a function of the contents of alite, ye'elimite and calcium monoaluminate of these hydraulic binders.

More particularly, the curable cement material according to the present invention is characterized in that the mass proportion of said source of sulfates with a solubility of less than 4 g·L$^{-1}$ is greater than 6.5% and more particularly is greater than 7%.

Preferably, the curable cement material according to the present invention is characterized in that it comprises at least one adjuvant chosen from:
- plasticizers,
- superplasticizers, especially polycarboxylates, melamine sulfonates, polynaphthalene sulfonates,
- setting retarders, for example gluconates, carboxylic acids (citric acid, tartaric acid), boric acid, alkali metal phosphates,
- setting accelerators, for example salts, nitrates, thiocyanates, chlorides,
- curing accelerators, especially alkali metal carbonates,
- air entrainers, especially sodium lauryl sulfates,
- anti-shrinkage agents,
- anti-bubbling or antifoam agents,
- leakproofing agents, for example calcium stearate,
- antisedimentation agents, especially bentonites, attapulgites,
- mineral or organic colored pigments,
- latices, especially styrene-butadiene or vinyl acetate-vinyl versatate or vinyl acetate-acrylic monomer copolymers, and
- rheology modifiers;
- especially modified or unmodified polysaccharides, preferentially diutan gums, xanthan gums, gellan gums, welan gums; and
- especially water retainers, preferentially starch ethers, cellulose ethers.

Supplementation of the curable cement material according to the present invention with a very small amount of an alkali metal carbonate (for example about 1% of $Li_2CO_3$ or $Na_2CO_3$ relative to the total mass of the binder composition) may be necessary when said hydraulic binder containing a mineralogical phase of alite type proves to be rich in free lime (CaO) and in portlandite ($Ca(OH)_2$). The term "rich" means more than 1.5% by mass of free lime and portlandite. More particularly, the supplementation with alkali metal carbonate may correspond to at least 2% of the mass of free lime and of portlandite, of said hydraulic binder containing a mineralogical phase of alite type.

The invention also relates to a curable cement material characterized in that it has a compression strength at 1 day of greater than 14 MPa and a strength at 28 days of greater than 30 MPa, when it is used at a temperature of between −10° C. and +5° C.

As a guide, a cement of Portland CEM II 32.5 type has a compression strength at 1 day, at +20° C., of about 12 or 13 MPa.

In a preferred embodiment, a subject of the present invention is a curable cement material characterized by a hydraulic binder composition comprising:
- from 62% to 66% of Portland cement, said Portland cement comprising from 60% to 70% of alite mineral phase, and
- from 22% to 28% of sulfoaluminous cement, said sulfoaluminous cement comprising from 50% to 72% of a mixture of the ye'elimite and calcium monoaluminate mineral phases, and
- from 1.7% to 3% of aluminum sulfate dodecahydrate to octadecahydrate, and
- from 8.5% to 13% of anhydrite.

The present invention also relates to the use of a curable cement material as defined previously, for the use of a material that is capable of setting in cold weather.

The term "material that is capable of setting in cold weather" especially denotes grouts, cement pastes, renderings, mortars and concretes defined previously, with the proviso that they develop in cold weather strengths comparable to those that a material of the same type based on Portland cement would develop at +20° C. within the same period.

The term "cold weather" means temperatures of between +10° C. and −20° C. These temperatures may be linked to the geography (latitude, altitude), the climate (winter) or to artificial conditions (cold rooms); this does not at all have any influence on the present invention.

In a particular embodiment, a subject of the present invention is the use of a curable cement material as defined previously, for a use at a temperature ranging from −10° C. to +5° C.

Below −10° C., it becomes difficult to keep the puddling water liquid.

Preferentially, the use of a curable cement material according to the present invention is characterized by a use with a water not containing ice.

The presence of solid water particles (ice) is not desirable for the use of the materials according to the present invention. The reason for this is that solid water cannot be mobilized for the formation of the hydrates required for the development of strength, especially for the appearance of ettringite. Ettringite (formula $3CaO.Al_2O_3.3CaSO_4.32H_2O$) requires 32 water molecules per crystal lattice. Moreover, on melting, the ice forms cavities (pores) in the cement matrix, which impairs the mechanical strength of the material.

Ideally, the temperature of the various materials (granulates, hydraulic binder composition) should be greater than 0° C. to avoid a post-glazing effect ("sorbet" effect) during puddling, also leading to the formation of ice crystals during puddling.

A subject of the present invention is also the use of a curable cement material as defined previously, and characterized by a maturation cure performed at temperatures ranging between −20° C. and +10° C.

The term "maturation cure" denotes the period during which the fresh curable cement material, i.e. the material just after puddling and then installation, is left to stand so that the hydrates contributing to the development of strength become formed. The range of acceptable temperatures for curing the material is broader than the range of acceptable temperatures for its use (casting). These temperature variations may be linked, for example, to the day-night cycles, to the sunlight, to meteorological variations (cold front or mild front).

Surprisingly, the minimum negative temperature, which is especially lower than during use, no longer poses the problems of presence of ice in the puddling water mentioned previously. Specifically, on the one hand, the water is rapidly saturated with sulfate salts (presence of the source of sulfates with a solubility of greater than 4 $g \cdot L^{-1}$), thus lowering its melting point; and, on the other hand, since ettringite appears rapidly, the water molecules required for its formation are already integrated into the ettringite and are no longer gellable, i.e. capable of gelling. The possible appearance of ice in the cement matrix a few hours after the use of the material is minimal, and therefore no longer poses any particular problems.

The curable cement material according to the present invention finds a particularly advantageous use for the use of a concrete, a mortar, a grout, a rendering or a cement paste.

Materials and Methods
Standards

The monitoring of the physicochemical and mechanical characteristics of the curable materials were performed according to European standard EN 196 paragraphs 1 to 7.

Materials Used

The amounts of materials used in the examples below are in accordance with European standard EN 196-1, namely:
 1350 g of CEN normalized sand
 225 g of water
 450 g of the hydraulic binder composition.

All the tests were performed at +5° C., according to the following protocol:

Method: weigh out the CEN sand and all the powder constituents of the hydraulic binder composition, to prepare 1.8 kg in total; place them in a 3-liter mixing bowl. Dry-mix for 1 minute at low speed (140 rpm with an epicycloidal (or planetary) drive actuating the mixing paddle at 1 rpm), cover the bowl with a leaktight plastic lid and then store this assembly for 24 hours at +5° C. in a refrigeration chamber.

Puddle this composition of hydraulic binders and sand by adding 225 g of water at +5° C. to the bowl containing the mixed composition of binders and sand. Blend for 60 seconds at 140 rpm with an epicycloidal (or planetary) drive actuating the mixing paddle at 1 rpm (low speed) and then blend for 30 seconds at 280 rpm with an epicycloidal drive of 2 rpm (high speed).

The characterization tests were then performed on these mortars.

The constituents of the hydraulic binder composition may be aluminum sulfate ($Al_2(SO_4)_3$.14 to $16H_2O$ (SMA), iron sulfate $7H_2O$, micronized anhydrite (calcium sulfate, Metausel), sulfoaluminous clinker (Argalum, Guardiareggia, Italy), Portland cement of class CEM I 52.5N CE CP2 NF. The cement used in the compositions of Examples 1 to 8 and 13 to 18 is a cement produced at the Couvrot factory; in the compositions of Examples 9 and 10, a cement produced at the Bussac factory; in the composition of Example 11, a cement produced at the Gargenville factory; and in the composition of Example 12, a cement produced at the Airvault factory.

Table 1 collates the main mineralogical phases of these cements (mass %).

TABLE 1

| Production factories | C3A | C3S | C2S | C4AF | SO3 |
|---|---|---|---|---|---|
| Airvault | 4.3 | 61 | 18.2 | 10.8 | 3.4 |
| Bussac | 5.5 | 64.3 | 10.8 | 12.1 | 3.2 |
| Couvrot | 13.1 | 63.2 | 10.2 | 4.1 | 3.5 |
| Gargenville | 6.6 | 66.1 | 10.6 | 10.4 | 3 |

CEN sand is a natural siliceous sand, especially in its finest fractions. It is clean, the grains are of generally isometric and rounded shape. It is dried and screened (see its particle size composition in Table 2).

TABLE 2

| Mesh aperture size (mm) | Cumulative retaining (%) |
|---|---|
| 0.08 | 99 ± 1 |
| 0.16 | 87 ± 5 |
| 0.50 | 67 ± 5 |
| 1.00 | 33 ± 5 |
| 1.60 | 7 ± 5 |
| 2.00 | 0 |

Chemical and Mineralogical Analyses

The analyses of the various chemical compositions, especially the various determinations of $SO_3$ of the sources of sulfates, were performed by X-ray fluorescence spectrometry (Magix Spectrometer, Panalytical).

The mineralogical analyses relating to the various phases of the clinkers constituting the mixture of hydraulic binders, or of cement, were performed by X-ray diffraction (XRD), with quantification of the mineralogical phases via the Rietveld method (XPERT PRO, Panalytical, EVA and TOPAS software).

Mechanical Characterizations
Tests Performed at +5° C.:

The setting time was measured with a Vicat needle for mortars according to standard NF P15-431.

The flexural strength and compression strength tests according to standard EN 196-1, and cured density tests were performed on mortar specimens (dimensions: 4 cm×4 cm×16 cm).

The specimens are prepared at +0° C. and stored in water at +5° C.

The size variation measurements according to standard NFP 15-433 were performed on specimens stored in water at +5° C. for the swelling measurements. The shrinkages are measured at +5° C. on specimens stored in air with a relative humidity content of 50%.

For the reference Portland cement (sample 1), the shrinkages were measured at +20° C. on specimens stored in air with a relative humidity content of 50%. The specimens for the swelling were stored in water at +20° C.

Tests Performed at −10° C.:

The compression strength tests on 16×32 cm and 4×4×16 cm specimens according to standard NF EN 12390-4, and the cured density tests, were performed on mortar specimens.

The specimens were prepared at +5° C. and then stored in their molds in a climatic chamber with a strong regulating current of air set at 65% RH and at −10° C.

Results

The results obtained are presented in the following tables. In order to simplify their reading, the following terms have been used:

Clinker S denotes a hydraulic binder containing a mineralogical phase of alite type (C3S), Clinker A denotes a hydraulic binder containing a mineralogical phase of aluminate type $SO_3>4$ denotes a source of sulfates with a solubility of greater than 4 g·L$^{-1}$, at 0° C.

$SO_3<4$ denotes a source of sulfates with a solubility of less than 4 g·L-1$^{-1}$, at 0° C.

The terms clinker S, clinker A, $SO_3>4$ and $SO_3<4$ indicate the mass proportions of each of these constituents relative to the total mass of the hydraulic binder composition.

The temperature indicates the temperature at which the samples were prepared and the measurements taken.

The start and end of setting of the samples are indicated in hours (values with decimal fractions).

The compression strength (Rc) and flexural strength (Rf) are indicated in MPa (or N/mm$^2$), at 1 day, 7 days and 28 days, after the end of mixing of the sample.

REFERENCE EXAMPLES 1 AND 2

Samples 1 and 2 (table 3) are reference comparative examples at, respectively, +20 and +5° C., containing only hydraulic binder containing a mineralogical phase of alite type (Portland cement). They serve as a point of comparison for evaluating the performance of the compositions according to the present invention (see table 3).

EXAMPLES 3 TO 8

The compositions according to the invention (samples 3 to 8) presented in table 3 gave samples (4×4×16 specimens) with a compression strength at 1 day of greater than 14 MPa and a strength at 28 days of greater than 30 MPa, despite being used at +5° C.

TABLE 3

| | Sample | | | | | | | |
|---|---|---|---|---|---|---|---|---|
| | No. 1 Ref. | No. 2 Ref. | No. 3 | No. 4 | No. 5 | No. 6 | No. 7 | No. 8 |
| Clinker S (%) | 100 | 100 | 63.3 | 65.0 | 65.0 | 65.0 | 60.0 | 63.0 |
| Clinker A (%) | — | — | 24.7 | 23.0 | 24.0 | 23.5 | 28.0 | 25.0 |
| $SO_3<4$ (%) | — | — | 10.0 | 10.0 | 9.0 | 9.5 | 7.0 | 8.0 |
| $SO_3>4$ (%) | — | — | 2.0 | 2.0 | 2.0 | 2.0 | 5.0 | 4.0 |
| Temperature | +20 | +5° C. | +5° C. | +5° C. | +5° C. | +5° C. | +5° C. | +5° C. |
| Start of setting (h) | 4.10 | 5.90 | 0.79 | 0.80 | 0.80 | 0.80 | 0.81 | 0.80 |
| End of setting (h) | 5.00 | 7.72 | 2.00 | 2.17 | 1.83 | 1.97 | 1.40 | 1.25 |
| Rf 1 day | 5.2 | 0.7 | 5.5 | 6.7 | 6.6 | 6.2 | 4.7 | 6.3 |
| Rc 1 day | 22.5 | 2.0 | 26.1 | 27.3 | 27.1 | 26.0 | 21.4 | 26.8 |
| Rf 7 days | 8.9 | 6.6 | 6.0 | 7.8 | 7.8 | 7.3 | 5.3 | 6.3 |
| Rc 7 days | 52.8 | 41.4 | 36.6 | 47.7 | 42.0 | 36.7 | 29.2 | 38.4 |
| Rf 28 days | 8.4 | 8.2 | 6.0 | 9.2 | 7.7 | 7.7 | 6 | 6.1 |
| Rc 28 days | 55.7 | 55.6 | 47.3 | 57.4 | 50.1 | 51.3 | 41 | 44.2 |

Samples 3, 4, 5 and 6

The source of sulfates with a solubility of greater than 4 g·L$^{-1}$ used is aluminum sulfate 14-16H$_2$O, the source of sulfates with a solubility of less than 4 g·L$^{-1}$ is anhydrite. It is observed that the setting times are short and that the strengths developed at 1 day are comparable to those of Portland cement at +20° C., but are largely superior to those of the same Portland cement at +5° C. The strengths at 28 days are comparable to those of Portland cement cast at +5° C. or +20° C.

Sample 7

The source of sulfates with a solubility of greater than 4 g·L$^{-1}$ used is iron sulfate 7H$_2$O, the source of sulfates with a solubility of less than 4 g·L$^{-1}$ is anhydrite. The results are comparable to those of the samples using aluminum sulfate as source of sulfates with a solubility of greater than 4 g·L$^{-1}$.

Sample 8

The source of sulfates with a solubility of greater than 4 g·L$^{-1}$ used is a combination of iron sulfate 7H$_2$O and aluminum sulfate 14-16H$_2$O; this combination is composed to 25% (by mass) of iron sulfate 7H$_2$O and to 75% (by mass) of aluminum sulfate 14-16H$_2$O. The source of sulfates with a solubility of less than 4 g·L$^{-1}$ is anhydrite. The results are comparable to those of the other samples using only one type of source of sulfates with a solubility of greater than 4 g·L$^{-1}$.

EXAMPLE 6A

This sample was prepared at a negative temperature of −10° C.:

The composition of the sample is the same as that used in sample 6.

A test was performed in a climatic chamber having a strong regulating current of air set at 65% RH and −10° C.

Two cylindrical specimens 16×32 cm in size were manufactured for the deadlines of 24 hours and 7 days, and the compression strength measurements gave the following results:

Compression strength at 24 hours at −10° C.: 11.5 MPa
Compression strength at 7 days at −10° C.: 21.5 MPa The same composition was used with 4×4×16 cm specimens, and the compression strength measurements gave the following results:

Compression strength at 24 hours at −10° C.: 8.5 MPa
Compression strength at 7 days at −10° C.: 23.2 MPa The strengths obtained are lower than those for the sample stored at +5° C. (sample 6). However, they remain higher than those for the reference sample at +5° C. (sample 2) over the short term (24 hours).

EXAMPLES 9 TO 12

The compositions presented in table 4 (samples 9, 10, 11 and 12) gave samples (4×4×16 specimens) having the desired short-term and long-term mechanical characteristics, despite a use at +5° C.

These samples were obtained with different hydraulic binders containing a mineralogical phase of alite type (Portland cement), originating from the Bussac factory (samples 9 and 10), the Gargenville factory (sample 11) and the Airvault factory (sample 12).

The source of sulfates with a solubility of greater than 4 $g \cdot L^{-1}$ used is aluminum sulfate 14-16$H_2O$, and the source of sulfates with a solubility of less than 4 $g \cdot L^{-1}$ is anhydrite.

TABLE 4

| | Sample | | | |
|---|---|---|---|---|
| | No. 9 | No. 10 | No. 11 | No. 12 |
| CK S (%) | 63.7 | 64.0 | 64.0 | 64.0 |
| CK A (%) | 25.6 | 25.0 | 25.0 | 25.0 |
| $SO_3$ <4 (%) | 8.8 | 9.0 | 9.0 | 9.0 |
| $SO_3$ >4 (%) | 1.9 | 2.0 | 2.0 | 2.0 |
| Temperature | +5° C. | +5° C. | +5° C. | +5° C. |
| Start of setting (h) | 0.85 | 0.70 | 1.17 | 1.58 |
| End of setting (h) | 1.05 | 0.77 | 1.23 | 1.78 |
| Rf 1 day | 5.1 | 6.3 | 6.3 | 5.4 |
| Rc 1 day | 21.9 | 25.3 | 31.0 | 25.8 |
| Rf 7 days | 8.4 | 6.4 | 7.5 | 6.7 |
| Rc 7 days | 45.7 | 36.8 | 44.4 | 42.9 |
| Rf 28 days | 9.0 | 6.0 | 5.6 | 6.1 |
| Rc 28 days | 59.5 | 46.1 | 47.1 | 49.2 |
| Shrinkage 28 days (μm/m) | — | — | −243 | −300 |

The results presented in table 4 prove the adaptability of the present invention to cements of different origins.

The proportions of hydraulic binder mixture relative to the mixture of sources of sulfates vary slightly between samples 9 and 10. The four samples have satisfactory strengths for the purposes of the present invention: a compression strength at 1 day greater than 14 MPa and a strength at 28 days of greater than 30 MPa, despite a use at +5° C.

COMPARATIVE EXAMPLES 13 TO 18 (SAMPLES 13 TO 18)

The compositions presented in table 5 gave samples that do not have the desired short-term and long-term mechanical characteristics (namely a compression strength at 1 day of greater than 14 MPa and a strength at 28 days of greater than 30 MPa, despite a use at +5° C.)

TABLE 5

| | Sample | | | | | |
|---|---|---|---|---|---|---|
| | No. 13 | No. 14 | No. 15 | No. 16 | No. 17 | No. 18 |
| Clinker S (%) | 67.0 | 61.0 | 70.0 | 50.0 | 83.0 | 87.0 |
| Clinker A (%) | 31.0 | 29.0 | 25.0 | 25.0 | — | — |
| $SO_3$ <4 (%) | — | 10.0 | 2.6 | 23.5 | 14.0 | 9.0 |
| $SO_3$ >4 (%) | 2.0 | — | 2.4 | 1.5 | 3.0 | 4.0 |
| Temperature | +5° C. | +5° C. | +5° C. | +5° C. | +5° C. | +5° C. |
| Start of setting (h) | 0.53 | 0.75 | 0.75 | 0.80 | 1.80 | 1.30 |
| End of setting (h) | 1.52 | 2.50 | 1.33 | 1.65 | 3.00 | 2.75 |
| Rf 1 day | 3.0 | 0.9 | 3.9 | 2.1 | 1.4 | 1.2 |
| Rc 1 day | 9.4 | 3.4 | 13.4 | 8.2 | 4.3 | 4.5 |
| Rf 7 days | 5.1 | 5.8 | 5.1 | — | 4.4 | 4.4 |
| Rc 7 days | 35.2 | 36.5 | 21.2 | — | 23.9 | 25.2 |
| Rf 28 days | 5.0 | 8.1 | 4.7 | — | 5.7 | 6.3 |
| Rc 28 days | 35.1 | 48.8 | 35.4 | — | 32.1 | 35.5 |

Samples 13 and 14

One of the two types of sources of sulfates is emitted in the composition of each of these samples. The source of sulfates with a solubility of greater than 4 $g \cdot L^{-1}$ is not present in the composition of sample 14, and the source of sulfates with a solubility of less than 4 $g \cdot L^{-1}$ is not present in the composition of sample 13. Poor short-term strengths are observed, particularly in the case of sample 14. A poor long-term strength is also observed, particularly in the case of sample 13. These compositions do not make it possible to obtain samples that satisfy the posed technical problem. The use of the two types of sources of sulfate, greater than and less than 4 $g \cdot L^{-1}$, is necessary.

Sample 15

The proportion of the mixture of binders (95%) relative to the mixture of sources of sulfates (5%) is high. The strengths developed at the various ages (1, 7 and 28 days) do not make it possible to satisfy the short-term and long-term requirements.

Sample 16

The proportion of the mixture of binders (75%) relative to the mixture of sources of sulfates (25%) is low. It is at the lower limit excluded from the present invention. The strengths developed at the various ages (1, 7 and 28 days) are very poor or even inexistent. Due to its excess of sulfates, especially of source of sulfates with a solubility of less than 4 $g \cdot L^{-1}$, this sample has destructive swelling after curing (the volume of the sample is doubled, the entire structure is broken and crumbly). This type of composition is entirely unusable.

Samples 17 and 18

The hydraulic binder containing a mineralogical phase of aluminate type is omitted from the composition of each of these samples. Various proportions of hydraulic binder containing a mineralogical phase of alite type and of mixture of sources of sulfates were tested in order to check that the strengths at 1 day are not due to the presence of a source of sulfates with a solubility of greater than 4 $g \cdot L^{-1}$. The strengths at 1 day observed are slightly greater than that of the reference Portland cement, but remain low and do not make it possible to provide a solution to the technical problem. The presence of the hydraulic binder containing a mineralogical phase of aluminate type is necessary.

The invention claimed is:

1. A cement material that is curable in the presence of water, comprising a composition of hydraulic binders containing a mixture of hydraulic binders and a mixture of sources of sulfates,
    wherein the mixture of hydraulic binders comprises
    at least one hydraulic binder containing an alite mineralogical phase, and
    at least one hydraulic binder containing an aluminum mineralogical phase, consisting predominantly of ye'elimite (C4A3$) or a mixture of ye'elimite and of calcium monoaluminate (CA)
    said mixture of sources of sulfates comprising
    at least one source of sulfates having a solubility of less than 4 g·L$^{-1}$, and
    at least one source of sulfates having a solubility of greater than 4 g·L$^{-1}$,
    said cement material comprising, in addition to said composition of hydraulic binders, optionally mineral additions, optionally fine granulates, optionally coarse granulates, and optionally adjuvants.

2. The cement material as claimed in claim 1, wherein the at least one hydraulic binder containing an alite mineralogical phase is a Portland clinker or a Portland cement.

3. The cement material as claimed in claim 1, wherein the at least one hydraulic binder containing an aluminate mineralogical phase is chosen from a sulfoaluminous clinker, a sulfobelitic clinker, or a mixture of these clinkers.

4. The cement material as claimed in claim 1, wherein the aluminate mineralogical phase also comprises mayenite (C12A7), tetracalcium aluminoferrite (C4AF), tricalcium aluminate (C3A), or a combination of several of these phases.

5. The cement material as claimed in claim 1, wherein the at least one source of sulfates with a solubility of less than 4 g·L$^{-1}$ is chosen from gypsum (CaSO$_4$.H$_2$O) and anhydrite (CaSO$_4$).

6. The cement material as claimed in claim 1, wherein the at least one source of sulfates with a solubility of greater than 4 g·L$^{-1}$ is chosen from aluminum sulfate (Al$_2$(SO$_4$)$_2$.12 to 18H$_2$O), iron sulfate (Fe(SO$_4$).4 to 7H$_2$O) and plaster (CaSO$_4$.½H$_2$O).

7. The cement material as claimed in claim 1, which comprises a hydraulic binder composition comprising: from more than 75% to less than 95% of said mixture of hydraulic binders, and from more than 5% to less than 25% of said mixture of sources of sulfates, said proportions being expressed relative to the total mass of the hydraulic binder composition.

8. The cement material as claimed in claim 1, which comprises the presence, in said mixture of hydraulic binders, of the following mineralogical phases:
    ye'elimite (C4A3$), mayenite (C12A7), calcium monoaluminate (CA), ferrite (C4AF), belite (C2S), tricalcium aluminate (C3A) and alite (C3S), said mineralogical phases having, relative to the total mass of said mixture of hydraulic binders, the following proportions:
    ye'elimite (C4A3$) and calcium monoaluminate (CA): 4% to 47%,
    mayenite (C12A7): 0 to 4%,
    ferrite (C4AF): 1% to 16%,
    belite (C2S): 5% to 29%,
    tricalcium aluminate (C3A): 1% to 14%,
    alite (C3S): 21% to 76%.

9. The cement material as claimed in claim 7, wherein the hydraulic binder composition comprises:
    a mass proportion of said hydraulic binder containing an alite mineralogical phase greater than a value: A–D–C, and less than a value: C,
    and a mass proportion of said hydraulic binder containing an aluminate mineralogical phase greater than a value: A–C and less than a value: D+B, and
    a mass proportion of said source of sulfates with a solubility of less than 4 g·L$^{-1}$ of greater than 6% and less than a value: B, and
    a mass proportion of said source of sulfates with a solubility of greater than 4 g·L$^{-1}$ of greater than 0% and less than a value: B,
    said mass proportions being expressed as percentages relative to the total mass of the hydraulic binder composition, and said values A, B, C and D corresponding to the following formulae:

$$A=100\times[115.3/(X_1+X_2)],$$

$$B=100-A,$$

$$C=[100\times(53.7-B)/X_1]+B,$$

$$D=100-C,$$

in which the values $X_1$ and $X_2$ correspond:
    for $X_1$ to the mass percentage of the alite mineralogical phase in said at least one hydraulic binder containing an alite mineralogical phase, and
    for $X_2$ to the mass percentage of the sum of the ye'elimite and calcium monoaluminate mineralogical phases in said at least one hydraulic binder containing an aluminate mineralogical phase,
    with the proviso that the sum $X_1+X_2$ is greater than 115.3.

10. The cement material as claimed in claim 1, further comprising at least one adjuvant chosen from: plasticizers, superplasticizers, setting retarders, setting accelerators, curing accelerators, air entrainers, anti-shrinkage agents, anti-bubbling or antifoam agents, impermeabilizers, anti-sedimentation agents, colored pigments, latices and rheology modifiers, modified or unmodified polysaccharides, diutan gums, xanthan gums, gellan gums, welan gums, water retainers, starch ethers, cellulose ethers.

11. The cement material as claimed in claim 1, having a compression strength at 1 day of greater than 14 MPa and a strength at 28 days of greater than 30 MPa, when used at a temperature of between −10° C. and +5° C.

12. The cement material as claimed in claim 1, which comprises a hydraulic binder composition comprising:
    from 62% to 66% of Portland cement, said Portland cement comprising from 60% to 70% of alite mineral phase, and
    from 22% to 28% of sulfoaluminous cement, said sulfoaluminous cement comprising from 50% to 72% of a mixture of the ye'elimite and calcium monoaluminate mineral phases, and
    from 1.7% to 3% of Al$_2$(SO$_4$)$_3$.12 to 18H$_2$O, and from 8.5% to 13% of anhydrite.

13. The cement material as claimed in claim 2, wherein the at least one hydraulic binder containing an aluminate mineralogical phase is chosen from a sulfoaluminous clinker, a sulfobelitic clinker, or a mixture of these clinkers.

14. The cement material as claimed in claim 2, wherein the aluminate mineralogical phase also comprises mayenite (C12A7), tetracalcium aluminoferrite (C4AF), tricalcium aluminate (C3A), or a combination of several of these phases.

15. The cement material as claimed in claim 2, wherein the at least one source of sulfates with a solubility of less than 4 $g \cdot L^{-1}$ is chosen from gypsum ($CaSO_4 \cdot 2H_2O$) and anhydrite ($CaSO_4$).

* * * * *